US008118010B2

(12) United States Patent
Shibata et al.

(10) Patent No.: US 8,118,010 B2
(45) Date of Patent: Feb. 21, 2012

(54) DIAGNOSTIC SYSTEMS AND METHODS FOR FUEL INJECTORS IN HOMOGENOUS CHARGE COMPRESSION IGNITION ENGINE SYSTEMS

(75) Inventors: Jonathan T. Shibata, Whitmore Lake, MI (US); Vijay Ramappan, Novi, MI (US); Andrew P Bagnasco, Plymouth, MI (US)

(73) Assignee: GM Global Technology Operations LLC

( * ) Notice: Subject to any disclaimer, the term of this patent is extended or adjusted under 35 U.S.C. 154(b) by 224 days.

(21) Appl. No.: 12/574,114

(22) Filed: Oct. 6, 2009

(65) Prior Publication Data

US 2011/0079193 A1 Apr. 7, 2011

(51) Int. Cl.
*F02M 7/28* (2006.01)

(52) U.S. Cl. ......... 123/435; 123/480; 123/295; 701/111

(58) Field of Classification Search .................. 123/295, 123/299, 300, 305, 435, 472, 480; 701/103–105, 701/111

See application file for complete search history.

(56) References Cited

U.S. PATENT DOCUMENTS

| | | | | |
|---|---|---|---|---|
| 5,179,925 | A * | 1/1993 | Orminski | 123/491 |
| 6,295,969 | B1 * | 10/2001 | Kato et al. | 123/470 |
| 6,518,763 | B2 * | 2/2003 | Sollart | 324/378 |
| 6,877,486 | B2 * | 4/2005 | Ellies et al. | 123/478 |
| 7,213,566 | B1 * | 5/2007 | Jankovic | 123/302 |
| 7,669,578 | B2 * | 3/2010 | Yamashita et al. | 123/295 |
| 7,848,874 | B2 * | 12/2010 | Hay et al. | 701/113 |
| 7,958,721 | B2 * | 6/2011 | Craig et al. | 60/286 |

* cited by examiner

*Primary Examiner* — Hai Huynh

(57) ABSTRACT

An engine control system for a homogenous charge compression ignition (HCCI) engine includes a fuel injector temperature determination module and a fuel injector control module. The fuel injector temperature determination module determines a temperature of a tip of a fuel injector based on a first temperature model when the HCCI engine is operating in an HCCI combustion mode, and determines the temperature of the tip of the fuel injector based on a second temperature model when the HCCI engine is operating in a spark ignition (SI) combustion mode. The fuel injector control module controls a fuel injector pulse width based on the determined temperature and a predetermined temperature threshold, wherein the fuel injector pulse width increases when the determined temperature is greater than the predetermined temperature threshold.

20 Claims, 3 Drawing Sheets

DIAGNOSTIC SYSTEMS AND METHODS FOR FUEL INJECTORS IN HOMOGENOUS CHARGE COMPRESSION IGNITION ENGINE SYSTEMS

FIELD

The present disclosure relates to homogenous charge compression ignition (HCCI) engine systems and more particularly to diagnostic systems and methods for fuel injectors in direct-injection HCCI engine systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Homogenous charge compression ignition (HCCI) engines combust an air/fuel (A/F) mixture within cylinders to produce drive torque. HCCI engines may combust the A/F mixture in different combustion modes. For example, in an HCCI combustion mode the A/F mixture may be automatically ignited when compressed by pistons (i.e. compression ignition). Alternatively, for example, in a spark ignition (SI) combustion mode the A/F mixture may be ignited by spark plugs in the cylinders after the pistons compress the A/F mixture.

The HCCI combustion mode may improve engine efficiency and/or fuel economy compared to the SI combustion mode. However, HCCI operation may be limited to a predetermined HCCI operating zone in order to reduce combustion noise and protect the engine from damage due to excessive pressure increases associated with HCCI. Therefore, pressure sensors may be implemented in one or more of the cylinders and may be used to monitor cylinder pressure, particularly during the HCCI combustion mode.

The HCCI combustion mode may require less fuel than the SI combustion mode. However, the HCCI combustion mode may also require more precise NF ratio control than the SI combustion mode to prevent increased emissions and/or increased noise, vibration, and/or harshness (NVH). More specifically, lower peak temperatures during the HCCI combustion mode may result in incomplete burning of fuel when fuel injection is not precisely controlled.

The incomplete burning of fuel may result in higher carbon monoxide (CO) and/or hydrocarbon (HC) pre-catalyst emissions during the HCCI combustion mode. For example, the increased CO and/or HC emissions may be higher during the HCCI combustion mode due to incomplete oxidation and/or trapped crevice gases, respectively. Conversely, insufficient fuel during the HCCI combustion mode may result in increased cylinder pressure during combustion which may result in increased NVH.

SUMMARY

This section provides a general summary of the disclosure, and is not a comprehensive disclosure of its full scope or all of its features.

An engine control system for a homogenous charge compression ignition (HCCI) engine includes a fuel injector temperature determination module and a fuel injector control module. The fuel injector temperature determination module determines a temperature of a tip of a fuel injector based on a first temperature model when the HCCI engine is operating in an HCCI combustion mode, and determines the temperature of the tip of the fuel injector based on a second temperature model when the HCCI engine is operating in a spark ignition (SI) combustion mode. The fuel injector control module controls a fuel injector pulse width based on the determined temperature and a predetermined temperature threshold, wherein the fuel injector pulse width increases when the determined temperature is greater than the predetermined temperature threshold.

A method for controlling a homogenous charge compression ignition (HCCI) engine includes determining a temperature of a tip of a fuel injector based on a first temperature model when the HCCI engine is operating in an HCCI combustion mode, determining the temperature of the tip of the fuel injector based on a second temperature model when the HCCI engine is operating in a spark ignition (SI) combustion mode, and controlling a fuel injector pulse width based on the determined temperature and a predetermined temperature threshold, wherein the fuel injector pulse width increases when the determined temperature is greater than the predetermined temperature threshold.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
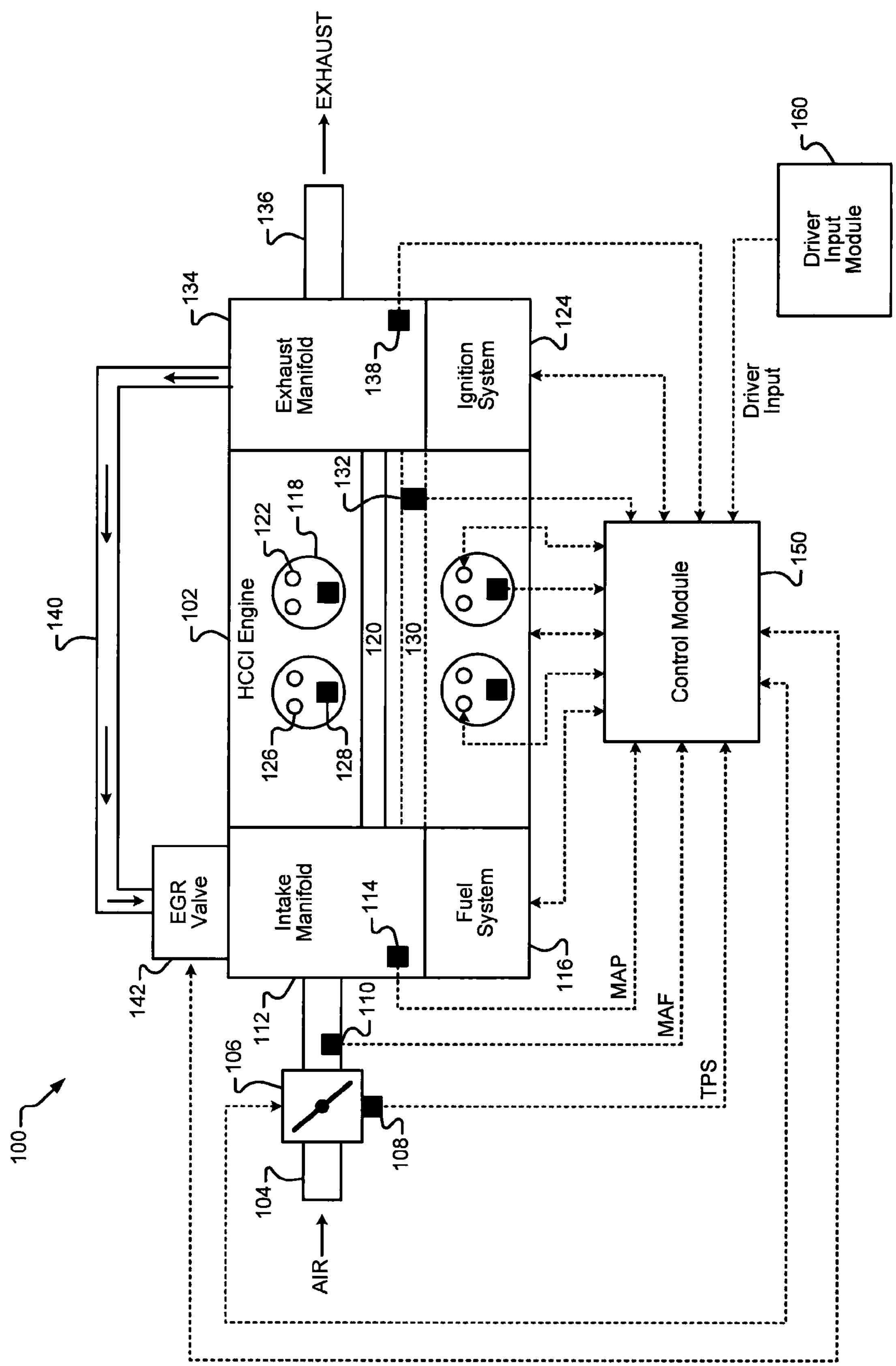
FIG. 1 is a functional block diagram of an exemplary homogenous charge compression ignition (HCCI) engine system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

HCCI combustion mode may require precise A/F ratio control to prevent increased emissions and/or increased noise, vibration, and/or harshness (NVH). Excessive fuel temperatures may result in less liquid fuel being injected than is desired due to decreased fuel density. For example only, a 100° C. increase in temperature may result in a 10% decrease in fuel density. Furthermore, excessive fuel temperatures may increase the temperature of an injector coil, resulting in a longer amount of time to open/close the fuel injector. The process of compensating for fuel metering variation due to temperature may be referred to as “hot fuel handling.”

For example, in a direct-injection (DI) engine, a tip of each fuel injector is located within a corresponding cylinder. Therefore, the tip of each fuel injector may be heated as a result of heat produced during compression and/or combustion. Thus, when a fuel injector tip has a temperature greater than a particular temperature threshold, less fuel may be injected than is desired. More specifically, less fuel may be injected than is desired due to decreased fuel density and/or delays in opening/closing the fuel injector. The less than desired amount of fuel may result in increased emissions and/or NVH.

Therefore, temperatures of the fuel injector tips may be modeled and then the pulse-widths of the fuel injectors may be controlled based on the modeled temperatures. For example, the pulse-widths may be increased when the temperatures of the fuel injector tips increase. However, modeling the temperatures of the fuel injectors based on the SI combustion mode characteristics may result in inaccurate modeling of fuel injector tip temperature when the engine is operating in the HCCI combustion mode. In other words, heat release profiles of cylinders may be higher in the SI combustion mode compared to the HCCI combustion mode, and thus the temperatures of fuel injector tips may be lower in the HCCI combustion mode.

For example, when fuel injector tip temperatures are modeled based on SI combustion characteristics when the engine is operating in the HCCI combustion mode, the higher modeled temperature may result in more being injected than is desired. The excessive amount of fuel may result in an incomplete burning of fuel during combustion, which may increase carbon monoxide (CO) and/or hydrocarbon (HC) pre-catalyst emissions. Alternatively, for example, injecting a lesser amount of fuel than is desired may result in increased cylinder pressures, which may increase NVH.

Furthermore, the fuel injector tip temperatures may be modeled during a transitional period from SI combustion mode to HCCI combustion mode, or vice-versa. In other words, there is a gradual shift between the temperature profiles of the two modes. Therefore, a third temperature model, hereinafter referred to as a transitional temperature model, may be implemented during transitional periods between combustion modes. For example, the transitional temperature model may include generally lower temperatures than the SI combustion mode temperature model, but generally higher temperatures than the HCCI combustion mode temperature model.

Therefore, systems and methods are presented that model fuel injector tip temperatures based on whether the engine is operating in the SI combustion mode, the HCCI combustion mode, or during a transition period between modes. In other words, the systems and methods presented may model fuel injector tip temperatures based on three or more different temperature models. For example, a plurality of different transitional temperature models may be implemented.

Thus, the systems and methods presented may then control fuel injector pulses based on more accurate modeled fuel injector tip temperatures. For example only, a wider (i.e. longer) fuel injector pulse (i.e. more liquid fuel) may be implemented to compensate for fuel injector tip temperatures greater than a predetermined temperature threshold. Furthermore, the systems and methods presented may prevent injection of excess fuel which may result in increased fuel economy and/or decreased emissions.

Referring now to FIG. 1, an exemplary implementation of an HCCI engine system 100 is shown. The HCCI engine system 100 includes an HCCI engine 102, an air inlet 104, a throttle 106, a TPS sensor 108, a MAF sensor 110, an intake manifold 112, and a MAP sensor 114.

Air is drawn into the HCCI engine 102 into the intake manifold 112 through the air inlet 104 that is regulated by the throttle 106. The TPS sensor 108 may generate a TPS signal based on a relative position of the throttle 106 (e.g., ranging from 0%, or closed, to 100%, or wide-open). The MAF sensor 110 may generate a MAF signal based on a mass air flow into the HCCI engine 102. For example, an engine load may be determined based on the signal from the MAF sensor 110. The MAP sensor 114 may generate a MAP signal based on a pressure inside the intake manifold 112.

The HCCI engine system 100 further includes a fuel system 116, a plurality of cylinders 118, a camshaft 120, a plurality of fuel injectors 122, an ignition system 124, a plurality of spark plugs 126, a plurality of cylinder pressure sensors 128, a crankshaft 130, and a crankshaft sensor 132.

Air inside the intake manifold 112 may be distributed to the plurality of cylinders 118. More specifically, the camshaft 120 actuates intake valves (not shown) that selectively open and close to enable the air from the intake manifold 112 to enter the cylinders 118. While one camshaft 120 is shown, it can be appreciated that more than one camshaft may be implemented (i.e. dual overhead camshafts, or DOHC). Additionally, while four cylinders 118 are shown, it can be appreciated that the HCCI engine 102 may include other numbers of cylinders.

The fuel system 116 may supply fuel to the plurality of fuel injectors 122. For example, the fuel system may include a fuel tank, a fuel pump, and/or a fuel rail. The plurality of fuel injectors 122 may inject fuel directly into the cylinders 118. The air mixes with the injected fuel to create the A/F mixture in the cylinders 118. The plurality of cylinder pressure sensors 128 continuously measure pressure inside the plurality of cylinders 118, respectively.

Pistons (not shown) within the cylinders 118 compress the A/F mixture. At low-to-medium engine loads and low-to-medium engine speeds, the A/F mixture is automatically ignited when compressed. Here, the HCCI engine system 100 is operating in the HCCI combustion mode. Otherwise, the ignition system 124 may ignite the A/F mixture or provide spark assist during HCCI operation via the spark plugs 126. Here, the HCCI engine system 100 is operating in the SI combustion mode. The combustion of the A/F mixture drives the pistons down, thereby driving the crankshaft 130 and producing drive torque. The crankshaft sensor 132 may generate an engine speed signal based on a rotational speed (e.g. in revolutions per minute, or RPM) of the crankshaft 130.

The HCCI engine system 100 further includes an exhaust manifold 134, an exhaust outlet 136, an exhaust back pressure (EBP) sensor 138, an exhaust gas recirculation (EGR) line 140, and an EGR valve 142.

The camshaft 120 also actuates exhaust valves (not shown) that selectively open and close to enable combustion exhaust from the cylinders 118 to enter the exhaust manifold 134. The exhaust gas may then be forced out of the engine system through the exhaust outlet 136. The EBP sensor 138 may measure pressure of the exhaust gas in the exhaust manifold 134.

The EGR line 140 and the EGR valve 142 may also introduce exhaust gas into the intake manifold 112. More specifically, the EGR line 140 extends from the exhaust manifold 134 to the EGR valve 142, and the EGR valve 142 may be mounted on the intake manifold 112 (as shown). Thus, the EGR valve 142 may selectively open and close to enable exhaust gas to enter the intake manifold 112. For example, recirculation of exhaust gas may lower peak combustion temperatures, and thus may increase efficiency of the HCCI engine 102.

The control module 150 controls operation of the HCCI engine system 100 based on driver input and various engine operating parameters. More specifically, the control module 150 receives driver input from a driver input module 160. For example only, the driver input module 160 may be an accelerator pedal and the driver input may correspond to a position of the accelerator pedal.

The control module 150 may control and/or communicate with the HCCI engine 102, the throttle 106 (i.e. electronic throttle control, or ETC), the fuel system 116, the ignition system 124, and/or the EGR valve 140. The control module 120 may also receive signals from the TPS sensor 108, the MAF sensor 110, the MAP sensor 114, the cylinder pressure sensors 128, the crankshaft sensor 132, and/or the EBP sensor 138.

Figure 2:
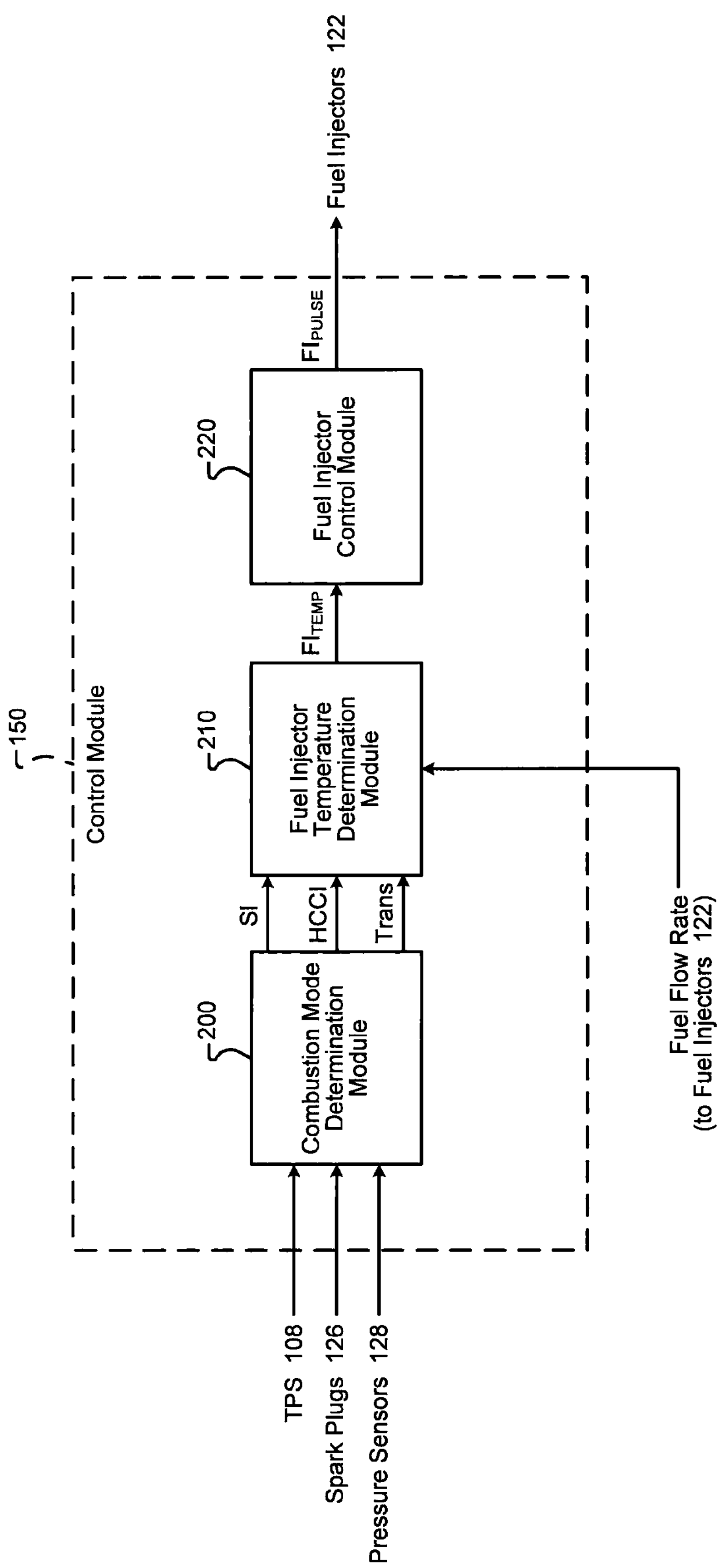
FIG. 2 is a functional block diagram of an exemplary control module according to the present disclosure.

Referring now to FIG. 2, the control module 150 is shown in more detail. The control module 150 includes a combustion mode determination module 200, a fuel injector temperature determination module 210, and a fuel injector control module 220.

The combustion mode determination module 200 receives a plurality of signals corresponding to the combustion mode of the HCCI engine 102. The combustion mode determination module 200 determines which combustion mode the engine system 100 is operating in based on the received signals. In other words, the combustion mode determination module 200 may determine whether the engine 102 is operating in the SI combustion mode or the HCCI combustion mode. The combustion mode determination module 200 may also determine whether the engine 102 is in a transitional period between combustion modes.

For example, in one embodiment the combustion mode determination module 200 may receive signals from the TPS sensor 108, the spark plugs 126, and/or the cylinder pressure sensors 128. However, it can be appreciated that other status signals may be used in determining the combustion mode of the HCCI engine 102.

For example only, the combustion mode determination module 200 may determine that the HCCI engine 102 is operating in the HCCI combustion mode when the TPS sensor 108 does not change over a period of time (i.e. the throttle 106 is being held open). Alternatively, for example only, the combustion mode determination module 200 may determine that the HCCI engine 102 is operating in the HCCI combustion mode when the spark plugs 126 are deactivated. Lastly, for example only, the combustion mode determination module 200 may determine that the HCCI engine 102 is operating in the HCCI combustion mode when cylinder pressure is less than a predetermined threshold.

The fuel injector temperature determination module 210 receives the mode of the HCCI engine 102. The fuel injector temperature determination module 210 determines a temperature of a tip of one of the fuel injectors 122 based on one of at least three temperature models and a fuel flow rate. For example only, the fuel injector temperature determination module 210 may determine fuel injector tip temperature based on one of three models: an SI temperature model, an HCCI temperature model, and a transitional temperature model. In one embodiment, the fuel injector tip temperature is based on a rate of fuel injection (i.e. from the fuel injectors 122) and one of three temperature models (i.e. SI, HCCI, and transitional). However, it can be appreciated that other signals may be used in determining the fuel injector tip temperature and/or more than three temperature models may be used. For example only, more temperature models may be used that each correspond to a different engine operating range.

The fuel injector control module 220 receives the determined fuel injector tip temperature. The fuel injector control module 220 generates a fuel injector control signal based on the determined fuel injector tip temperature and a plurality of predetermined temperature thresholds. For example, the fuel injector control module 220 may generate a pulse-width control signal for one or more of the fuel injectors 122. The plurality of predetermined temperature thresholds may correspond to different fuel densities and/or different delays in opening/closing the fuel injectors. In other words, the determined fuel injector tip temperature may be greater than one or more of the plurality of predetermined temperature thresholds. Thus, the fuel injector control module 220 may generate a fuel injector control signal to compensate for the changes in fuel density and/or delay in opening/closing the fuel injector.

Figure 3:
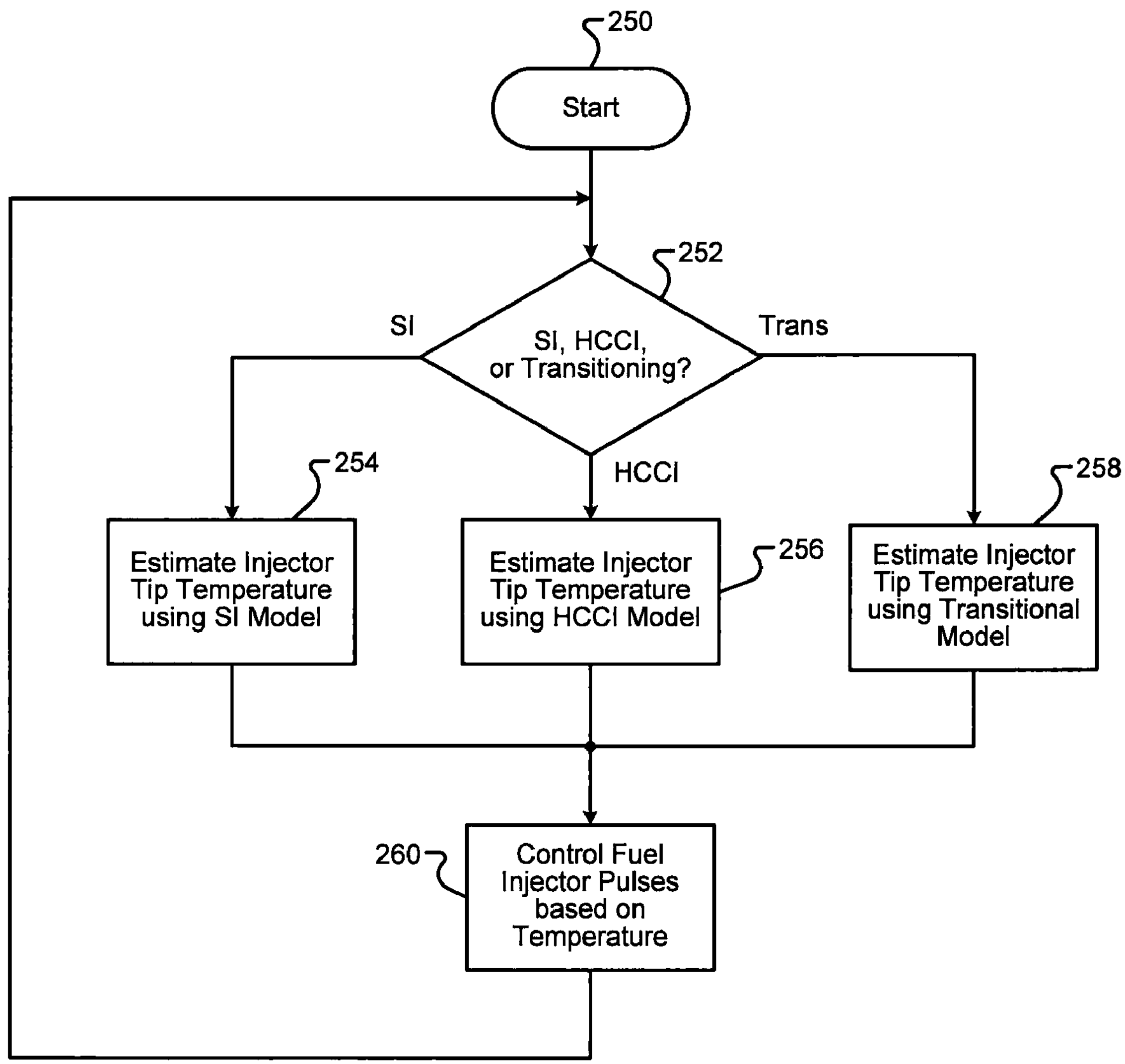
FIG. 3 is a flow diagram of a method for determining and compensating for fuel injector temperature in an HCCI engine system according to the present disclosure.

Referring now to FIG. 3, a method of operating the HCCI engine system 100 begins in step 250. In step 252, the control module 150 determines whether the HCCI engine 102 is operating in SI combustion mode or HCCI combustion mode, or is transitioning between modes. If the HCCI engine 102 is operating in SI combustion mode, control may proceed to step 254. If the HCCI engine 102 is operating in HCCI combustion mode, control may proceed to step 256. If the HCCI engine 102 is transitioning between combustion modes, control may proceed to step 258.

In step 254, the control module 150 may determine fuel injector tip temperature according to an SI temperature model. Control may then proceed to step 260. In step 256, the control module 150 may determine fuel injector tip temperature according to an HCCI temperature model. Control may then proceed to step 260. In step 258, the control module 150 may determine fuel injector tip temperature according to a transitional temperature model. Control may then proceed to step 260.

In step 260, the control module 150 may generate fuel injector control signals based on the determined fuel injector tip temperature and a plurality of predetermined temperature thresholds. Control may then return to step 252.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An engine control system for a homogenous charge compression ignition (HCCI) engine, comprising:

a fuel injector temperature determination module that determines a temperature of a tip of a fuel injector based on a first temperature model when the HCCI engine is operating in an HCCI combustion mode, and that determines the temperature of the tip of the fuel injector based on a second temperature model when the HCCI engine is operating in a spark ignition (SI) combustion mode; and a fuel injector control module that controls a fuel injector pulse width during an engine on period based on the determined temperature and a predetermined temperature threshold, wherein the fuel injector pulse width increases when the determined temperature is greater than the predetermined temperature threshold.

2. The engine control system of claim 1, wherein the fuel injector determination module determines the temperature of the tip of the fuel injector based on a third temperature model when the HCCI engine is transitioning between combustion modes.

3. The engine control system of claim 2, wherein the first temperature model includes a first range of temperatures, wherein the second temperature model includes a second range of temperatures, wherein the third temperature model includes a third range of temperatures, wherein a portions of the first and third ranges of temperatures are less than the second range of temperatures, and wherein a portion of the first range of temperatures is less than the third range of temperatures.

4. The engine control system of claim 2, wherein the fuel injector temperature determination module determines the temperature of the tip of the fuel injector based on a flow rate of fuel to the fuel injector and one of the first, second, and third temperature models.

5. The engine control system of claim 1, wherein the fuel injector control module controls the fuel injector pulse width based on the determined temperature and a plurality of temperature thresholds.

6. The engine control system of claim 5, wherein each of the plurality of temperature thresholds corresponds to one of fuel density and delay in one of opening and closing the fuel injector.

7. The engine control system of claim 5, wherein the fuel injector control module increases the fuel injector pulse width when the determined temperature is greater than one of the plurality of temperature thresholds.

8. The engine control system of claim 1, further comprising:

a combustion mode determination module that determines an operation mode of the HCCI engine, wherein the operation mode is one of the SI combustion mode, the HCCI combustion mode, and a transition between the modes.

9. The engine control system of claim 8, wherein the combustion mode determination module determines the operation mode of the HCCI engine based on at least one of a position of a throttle, a status of a spark plug, and a pressure in a cylinder of the HCCI engine.

10. The engine control system of claim 1, wherein the fuel injector control module controls the fuel injector pulse width by generating a pulse-width modulated (PWM) control signal.

11. A method for controlling a homogenous charge compression ignition (HCCI) engine, comprising:

determining a temperature of a tip of a fuel injector based on a first temperature model when the HCCI engine is operating in an HCCI combustion mode;

determining the temperature of the tip of the fuel injector based on a second temperature model when the HCCI engine is operating in a spark ignition (SI) combustion mode; and controlling a fuel injector pulse width during an engine on period based on the determined temperature and a predetermined temperature threshold, wherein the fuel injector pulse width increases when the determined temperature is greater than the predetermined temperature threshold.

12. The method of claim 11, further comprising:

determining the temperature of the tip of the fuel injector based on a third temperature model when the HCCI engine is transitioning between combustion modes.

13. The method of claim 12, wherein the first temperature model includes a first range of temperatures, wherein the second temperature model includes a second range of temperatures, wherein the third temperature model includes a third range of temperatures, wherein a portions of the first and third ranges of temperatures are less than the second range of temperatures, and wherein a portion of the first range of temperatures is less than the third range of temperatures.

14. The method of claim 12, further comprising:

determining the temperature of the tip of the fuel injector based on a flow rate of fuel to the fuel injector and one of the first, second, and third temperature models.

15. The method of claim 11, further comprising:

controlling the fuel injector pulse width based on the determined temperature and a plurality of temperature thresholds.

16. The method of claim 15, wherein each of the plurality of temperature thresholds corresponds to one of fuel density and delay in one of opening and closing the fuel injector.

17. The method of claim 15, further comprising:

increasing the fuel injector pulse width when the determined temperature is greater than one of the plurality of temperature thresholds.

18. The method of claim 11, further comprising:

determines an operation mode of the HCCI engine, wherein the operation mode is one of the SI combustion mode, the HCCI combustion mode, and a transition between the modes.

19. The method of claim 18, further comprising:

determining the operation mode of the HCCI engine based on at least one of a position of a throttle, a status of a spark plug, and a pressure in a cylinder of the HCCI engine.

20. The method of claim 11, further comprising:

controlling the fuel injector pulse width by generating a pulse-width modulated (PWM) control signal.

* * * * *